United States Patent
Dagg et al.

(10) Patent No.: US 7,052,025 B2
(45) Date of Patent: May 30, 2006

(54) APPARATUS FOR PRELOADING A TORSION BAR

(75) Inventors: John K. Dagg, Shelby Township, MI (US); Jacek Marchel, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 322 days.

(21) Appl. No.: 10/650,206

(22) Filed: Aug. 28, 2003

(65) Prior Publication Data
US 2005/0046138 A1 Mar. 3, 2005

(51) Int. Cl.
*B60G 21/55* (2006.01)

(52) U.S. Cl. .......................... 280/124.106; 280/124.152

(58) Field of Classification Search ......... 280/124.101, 280/124.102, 124.107, 124.152, 124.166, 280/124.167, 5, 5.1, 124.137, 124.149, 124.153; 267/188, 273, 276, 278, 183, 277; 33/612
See application file for complete search history.

(56) References Cited

U.S. PATENT DOCUMENTS

| | | | | |
|---|---|---|---|---|
| 2,606,758 A * | 8/1952 | Collier | ...................... | 267/278 |
| 2,624,568 A * | 1/1953 | Kany | ......................... | 267/278 |
| 3,432,158 A * | 3/1969 | Goodwin | ..................... | 267/278 |
| 4,243,247 A * | 1/1981 | Kataoka | ..................... | 267/278 |
| 5,609,331 A * | 3/1997 | Hoag et al. | ................. | 267/154 |
| 5,685,527 A * | 11/1997 | Harbali et al. | .............. | 267/277 |
| 5,687,960 A * | 11/1997 | Moon | ......................... | 267/273 |
| 6,357,771 B1 * | 3/2002 | Clements et al. | ...... | 280/124.13 |
| 6,364,297 B1 * | 4/2002 | Weber | ........................ | 267/273 |
| 6,454,284 B1 * | 9/2002 | Worman, Jr. | ......... | 280/124.167 |

* cited by examiner

*Primary Examiner*—Paul N. Dickson
*Assistant Examiner*—Tiffany Webb
(74) *Attorney, Agent, or Firm*—Laura C. Hargitt

(57) ABSTRACT

An apparatus for preloading a torsion bar includes an adjuster arm that is adapted to be attached to and extend radially from a torsion bar and includes a free end with an involute surface formed thereon. An adjustment nut is adapted to be rigidly attached to a support member for the torsion bar adjacent a free end of the adjuster arm. An adjustment bolt having a free end for engaging the involute surface of the adjuster arm is threadably engaged in the adjustment nut. When the adjuster arm is attached to the torsion bar and the adjustment nut is attached to the support member, rotation of the adjustment bolt rotates the adjuster arm and the torsion bar about a longitudinal axis of the torsion bar thereby changing a preload applied to the torsion bar. The adjustment bolt remains perpendicular to the involute surface while the adjuster arm rotates.

9 Claims, 4 Drawing Sheets

APPARATUS FOR PRELOADING A TORSION BAR

BACKGROUND OF THE INVENTION

The present invention relates in general to automobile suspension systems and, in particular, to an adjustment mechanism for a torsion bar suspension.

Automobile suspension systems, which are used to provide a smooth ride for an automobile body as well as to set a trim height for the automobile body, are well known. These suspension systems typically include a torsion bar assembly for setting the body trim height. The torsion bar assembly includes a torsion bar that is attached perpendicular to an adjuster arm and includes an adjustment bolt for setting a predetermined torque value, or preload, on the torsion bar by twisting the torsion bar about its longitudinal axis. As the adjustment bolt is raised or lowered, an end of the bolt that engages the adjustment arm rotates the adjustment arm, providing a torque to the torsion bar.

In some prior art torsion bar assemblies, the adjustment bolt toggles out of position, causing a loss of trim height in the suspension. The toggling also moves the adjustment bolt head out of position for the automated equipment that performs the final preload torsion bar adjustment. Once the adjustment bolt is toggled, the automated equipment puts undue bending stresses on the adjustment bolt that was intended to be in pure compression or loaded axially.

It is desirable, therefore, to provide an apparatus for preloading a torsion bar that allows the adjustment bolt of the torsion bar assembly to function as intended without causing undue bending stresses on the adjustment bolt.

SUMMARY OF THE INVENTION

The present invention concerns an apparatus for preloading a torsion bar. The apparatus includes an adjuster arm that is adapted to be attached to and extend radially from a torsion bar and includes a free end with an involute surface formed thereon. An adjustment nut is adapted to be rigidly attached to a support member for the torsion bar adjacent a free end of the adjuster arm. An adjustment bolt having a free end for engaging the involute surface of the adjuster arm is threadably engaged in the adjustment nut. When the adjuster arm is attached to the torsion bar and the adjustment nut is attached to the support member, rotation of the adjustment bolt rotates the adjuster arm and the torsion bar about a longitudinal axis of the torsion bar thereby changing a preload applied to the torsion bar.

The apparatus in accordance with the present invention advantageously allows the adjuster bolt to be advanced along a straight line, making automated adjustment of the bolt more efficient and practical. The apparatus accomplishes this by providing a predetermined shape profile of the contact surface between the torsion bar adjuster arm and the adjuster bolt. The profile of the involute contact surface on the adjuster arm is a key element in the design of the present invention. By using an involute surface, the resulting static load on the adjuster bolt is purely axial, which advantageously eliminates the tendency of the adjuster bolt to tip or toggle out of position. The apparatus in accordance with the present invention is intended for use on a torsion bar vehicle suspension, but could be applied to other mechanisms as well including, but not limited to trunk lids or any other type of system utilizing torsional springs.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
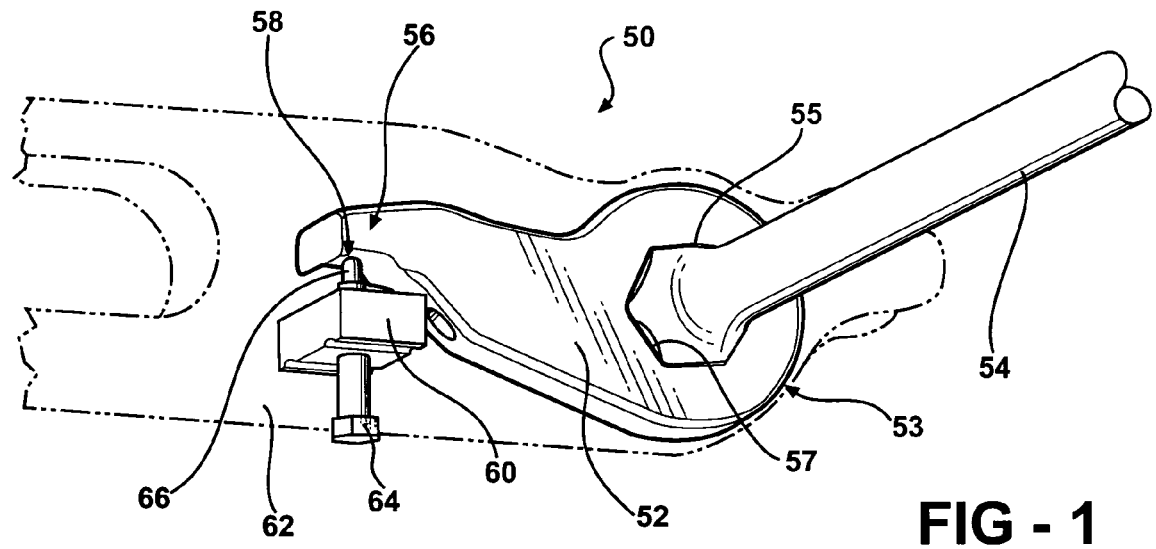
FIG. 1 is a perspective view of an apparatus for preloading a torsion bar in accordance with the present invention.
Figure 2:
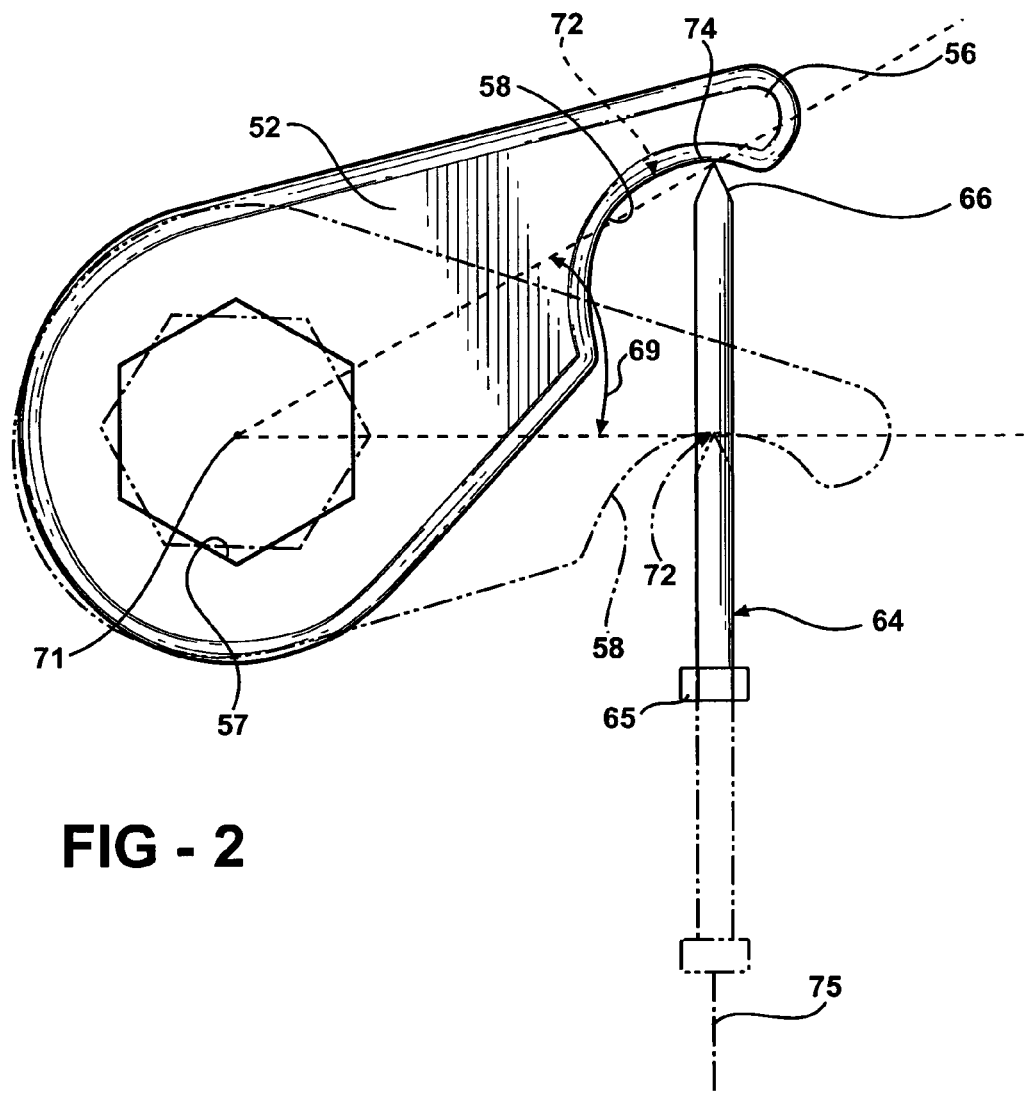
FIG. 2 is an enlarged side elevation view of the apparatus of FIG. 1 with the adjuster arm shown in a nominal position and an articulated position.

Referring now to FIGS. 1 and 2, an apparatus for preloading a torsion bar 54 in accordance with the present invention is indicated generally at 50. The apparatus 50 includes an adjuster arm 52 that is adapted to be attached to and extend radially from the torsion bar 54 and includes a free end 56 with an involute surface 58 formed thereon. The torsion bar 54 has a hexagonal cross section portion 55 that extends through a similarly shaped aperture 57 formed in the adjuster arm 52 to prevent relative rotation between the bar and the arm. An adjustment nut 60 adapted to be rigidly attached to a support member 62 for the torsion bar 54 is adjacent the free end 56 of the adjuster arm 52. The adjustment nut 60 can be a separate component or formed integral with the support member 62. An adjustment bolt 64 having a free end 66 for engaging the involute surface 58 of the adjuster arm 52 is threadably engaged in the adjustment nut 60. The adjustment bolt 64 includes a bolt head 65 on an end opposite the free end 66.

The torsion bar 54 is fixed at a portion (not shown) that is spaced from the hexagonal portion 55 that is attached to the adjuster arm 52. The free end 66 of the adjustment bolt 64 that engages with the involute surface 58 is preferably rounded or tapered to allow for smooth engagement with the involute surface 58. Best seen in FIG. 2, the adjustment bolt 64 and the adjuster arm 52 are operable to move from a lower, nominal position, shown in broken lines, to an upper, articulated position, shown in solid lines, discussed in greater detail below. An angle 69 is shown that represents the change in position of the longitudinal axis of the adjuster arm 52 between the nominal position and the articulated position about a center of rotation 71 on the longitudinal axis of the bar 54. At the nominal position, the free end 66 of the adjustment bolt 64 contacts the involute surface 58 at a contact point 72. At the articulated position, the free end 66 of the adjustment bolt 64 contacts the involute surface 58 at another contact point 74 spaced apart from the contact point 72 along the involute surface 58.

Figure 3:
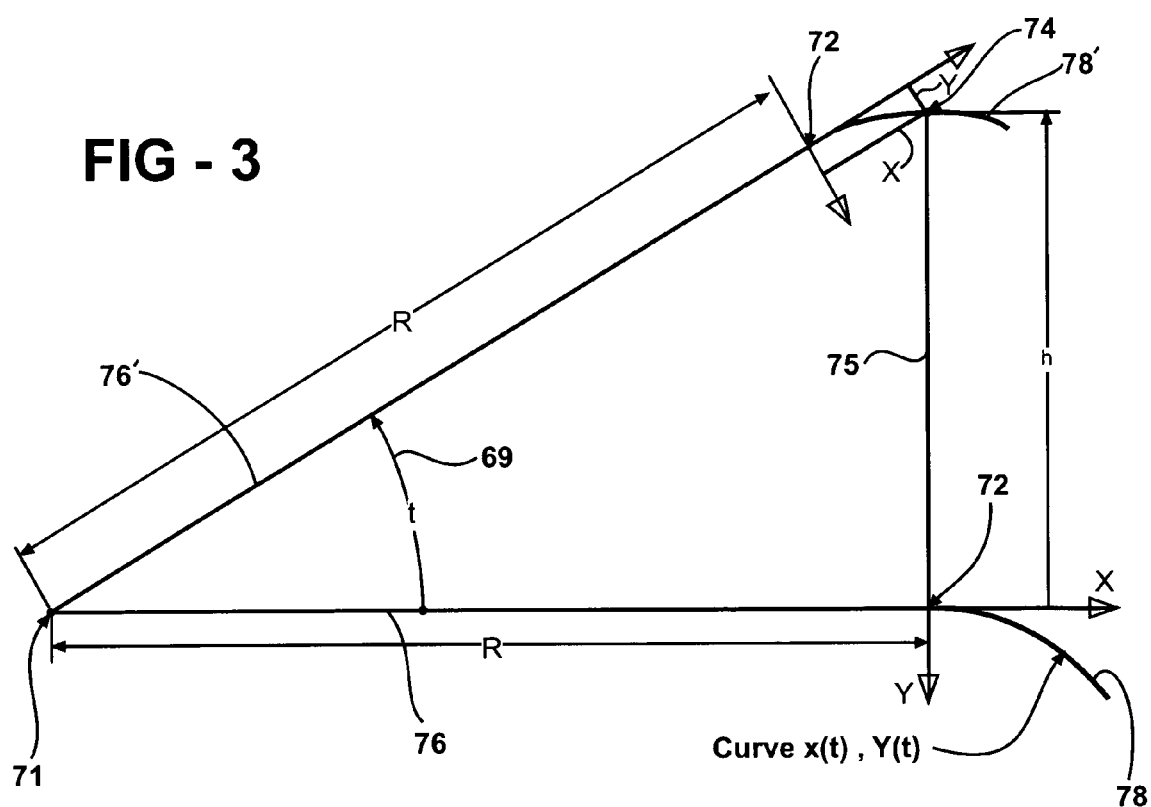
FIG. 3 is a graphical representation the geometry of the apparatus of FIG. 2.

The involute surface 58 is the heart of the present invention. The profile of the involute surface 58 is developed by a mathematical model, as shown in FIG. 3, which is a graphical representation of the adjuster arm 52, the adjustment bolt 64, and the involute surface 58. A line 76 in FIG. 3 represents a longitudinal axis of the adjuster arm 52 in the nominal position of FIG. 2; a line 76' in FIG. 3 represents the longitudinal axis of the adjuster arm 52 in the articulated position of FIG. 2; a curve x(t), y(t) 78 in FIG. 3 represents the involute surface 58 in the nominal position of FIG. 2; and a curve 78' in FIG. 3 represents the involute surface 58 in the articulated position of FIG. 2. In addition, the contact points 72 and 74 and the center of rotation 71 of FIG. 2 are shown graphically in FIG. 3.

At the nominal position, the line 76 extending between the center of rotation 71 and the contact point 72 is horizontal and has a length R. At the contact point 72, a local coordinate system X-Y associated with the adjuster arm 52 is established with an origin exactly at the contact point 72. The origin 72 has an axis X perpendicular to a longitudinal axis 75 of the adjustment bolt 64 away from the adjuster arm rotation center 71, and an axis Y pointing along the longitudinal axis of the adjustment bolt 64 towards the bolt head 65. In this coordinate system, the unknown profile curve, discussed in more detail below, will be found and described parametrically as a function of x(t) and y(t), where t is the parameter, an angle of rotation of the adjuster arm 52 corresponding to the angle 69 of FIG. 2. The line 76' is rotated from the line 76 by the angle of t. The contact point 74 on the line 76' is now at the vertical distance of h from the nominal line 76, i.e., the bolt 64 moved upwardly by h and the contact point 74 now touches the curve 78' at the point x-y in the also rotated local coordinate system of X-Y. Notice, however, that the free end 66 of the adjustment bolt 64 has been sliding along the profile of the involute surface 58 but the longitudinal axis 75 of the adjustment bolt 64 is still perpendicular at the contact point 74 to the involute surface 58. In order for the present invention to function correctly, it is desirable to define the curve of the involute surface 58 mathematically in order for the apparatus 50 to be manufactured easily for any reasonable value of t.

The following two equations, noted below, allow one to find a profile curve for the involute surface 58 in the parametric form:

$$R*\cos(t)+x(t)*\cos(t)+y(t)*\sin(t)=R \quad \text{(equation 1)}$$

$$\frac{dy}{dx}=\tan(t) \quad \text{(equation 2)}$$

The equation 1 is the horizontal component of the distance between the contact point 72 and the adjuster arm rotation center 71 at the articulated position and is always equal to R. The equation 2 describes that the surface 58 is perpendicular to the longitudinal axis 75 of the adjustment bolt 64 at the contact point 74, i.e., the tangent should be horizontal at the contact point 74 and, therefore, also at the angle t to the rotated X axis of the local coordinate system X-Y.

The equation 2 can be rewritten as follows:

$$\frac{dy(t)}{dt}*\cos(t)=\frac{dx(t)}{dt}*\sin(t). \quad \text{(equation 3)}$$

The left side of the equation 3 can be written as follows:

$$\frac{dy(t)}{dt}*\cos(t)=\frac{d(y(t)*\cos(t))}{dt}+y(t)*\sin(t). \quad \text{(equation 4)}$$

The right side of the equation 3 can be written as follows:

$$\frac{dx(t)}{dt}*\sin(t)=\frac{d(x(t)*\sin(t))}{dt}-x(t)*\cos(t) \quad \text{(equation 5)}$$

Because from the equation 3 it is known that the equation 4 is equal to the equation 5, it follows that:

$$\frac{d(y(t)*\cos(t))}{dt}+y(t)*\sin(t)=\frac{d(x(t)*\sin(t))}{dt}-x(t)*\cos(t). \quad \text{(equation 6)}$$

Further, the equation 6 can be rewritten as follows:

$$\frac{d(x(t)*\sin(t)-y(t)*\cos(t))}{dt}=x(t)*\cos(t)+y(t)*\sin(t). \quad \text{(equation 7)}$$

The right side of the equation 7 can be rewritten using the equation 1 in order to eliminate unknown x(t) and y(t) in order to obtain:

$$\frac{d(x(t)*\sin(t)-y(t)*\cos(t))}{dt}=R-R*\cos(t) \quad \text{(equation 8)}$$

The equation 8 can be now integrated in order to obtain as follows:

$$x(t)*\sin(t)-y(t)*\cos(t)=R*t-R\sin(t)+K \quad \text{(equation 9)},$$

where K is the integration constant.

From the nominal position 76, one can see that for t=0, the adjustment bolt 64 is contacting the curve 78 at point (0,0) that is y(0)=0 and x(0)=0. This boundary condition allows one to find out that K=0. Knowing this, and using again the rewritten equations 1 and 9, the set of the following two equations may be obtained:

$$x(t)*\cos(t)+y(t)*\sin(t)=R-R*\cos(t) \quad \text{(equation 10)},$$

which is a modified equation 1 and $$x(t)*\sin(t)-y(t)*\cos(t)=R*t-R*\sin(t) \quad \text{(equation 11)},$$

which is a modified equation 9. By multiplying the equation 10 by cos(t) to obtain an equation 10' (not shown) and by multiplying the equation 11 by sin(t) to obtain an equation 11' (not shown) and by then adding the respective equations 10' and 11', the following equation is obtained:

$$x(t)=R*(\cos(t)+t*\sin(t)-1) \quad \text{(equation 12)}$$

By multiplying the equation 10 by sin(t) to obtain an equation 10" (not shown) and by multiplying the equation 11 by cos(t) to obtain an equation 11" and subtracting the respective modified equations 10" and 11" the following equation is obtained:

$$y(t)=R*(\sin(t)-t*\cos(t)) \quad \text{(equation 13)}$$

The set of the equations 12 and 13, therefore, is the solution of the initial problem, which is to find the profile curve 78 for the involute surface 58 in the parametric form.

Figure 4:
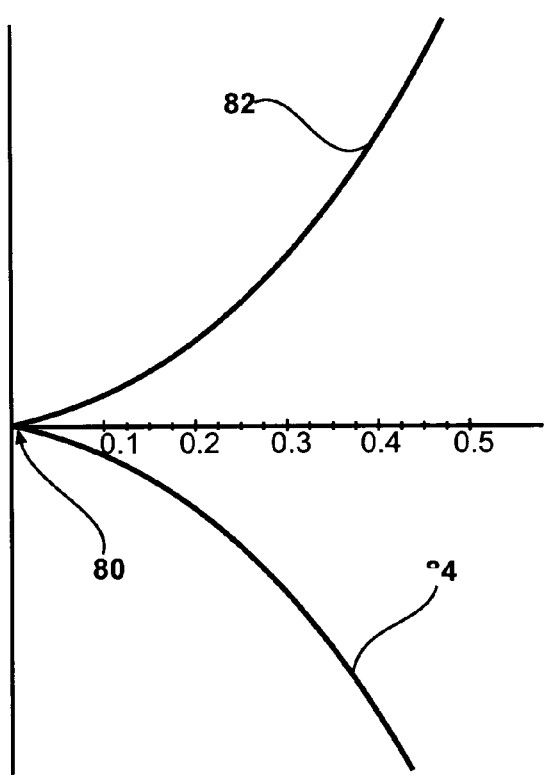
FIG. 4 is a graph depicting an involute curve.

Referring now to FIG. 4, a curve 80 is shown that is a plot of the equations 12 and 13 for a range of t: $-1.5 < t < 1.5$ and for R equal to a unit length of 1. The curve 80 has an upper branch 82 and a lower branch 84. The upper branch 82 is valid for t>0 and describes a concave profile of the involute surface 58 of the adjuster arm 52. The lower branch 84 is valid for t<0 and describes a convex profile of the involute surface 58 of the adjuster arm 52. The curve 80 illustrates that there are two separate and incompatible profiles 82 and 84 for all ranges of t. The design of the adjuster arm 52 that allows the free end 66 of the adjustment bolt 64 to pass through the nominal position within its allowed adjustment range, where negative and positive values of t are allowed, would be then theoretically impossible and, therefore, should be avoided.

Referring again to FIG. 3, the bolt travel h for each t may be calculated. The travel h will be expressed as follows:

$$h = R*\sin(t) + x(t)*\sin(t) - y(t)*\cos(t) \quad \text{(equation 14)}$$

Using the obtained curve equations 12 and 13 the following equation is obtained:

$$h(t) = R*t \quad \text{(equation 15)}$$

It is desirable to find the radius of curvature of the involute surface 58 as a function of t. The radius of curvature for the parametric curve is defined as follows:

$$r(t) = \frac{\left(\left(\frac{dx(t)}{dt}\right)^2 + \left(\frac{dy(t)}{dt}\right)^2\right)^{\frac{3}{2}}}{\frac{dx(t)}{dt} * \frac{d^2y(t)}{dt^2} - \frac{dy(t)}{dt} * \frac{d^2x(t)}{dt^2}} \quad \text{(equation 16)}$$

Substituting known x(t) and y(t) from the equations 12 and 13, leads to the solution for the radius of the curvature:

$$r(t) = R*t \quad \text{(equation 17)}$$

The following steps enable one to obtain the evolute, discussed in more detail below, of the profile of the involute surface 58. The center of the curvature is defined as follows:

$$xc(t) = x(t) - \frac{\frac{dy(t)}{dt} * \left(\left(\frac{dx(t)}{dt}\right)^2 + \left(\frac{dy(t)}{dt}\right)^2\right)}{\frac{dx(t)}{dt} * \frac{d^2y(t)}{dt^2} - \frac{dy(t)}{dt} * \frac{d^2x(t)}{dx^2}} \quad \text{(equation 18)}$$

$$yc(t) = y(t) + \frac{\frac{dx(t)}{dt} * \left(\left(\frac{dx(t)}{dt}\right)^2 + \left(\frac{dy(t)}{dt}\right)^2\right)}{\frac{dx(t)}{dt} * \frac{dy(t)}{dt^2} - \frac{dy(t)}{dt} * \frac{d^2x(t)}{dt^2}} \quad \text{(equation 19)}$$

Substituting the known profile solution from the equations 12 and 13, the parametric equation of the evolute is:

$$xc(t) = R*(\cos(t)-1) \quad \text{(equation 20)}$$

$$yc(t) = R*\sin(t) \quad \text{(equation 21)}$$

Figure 5:
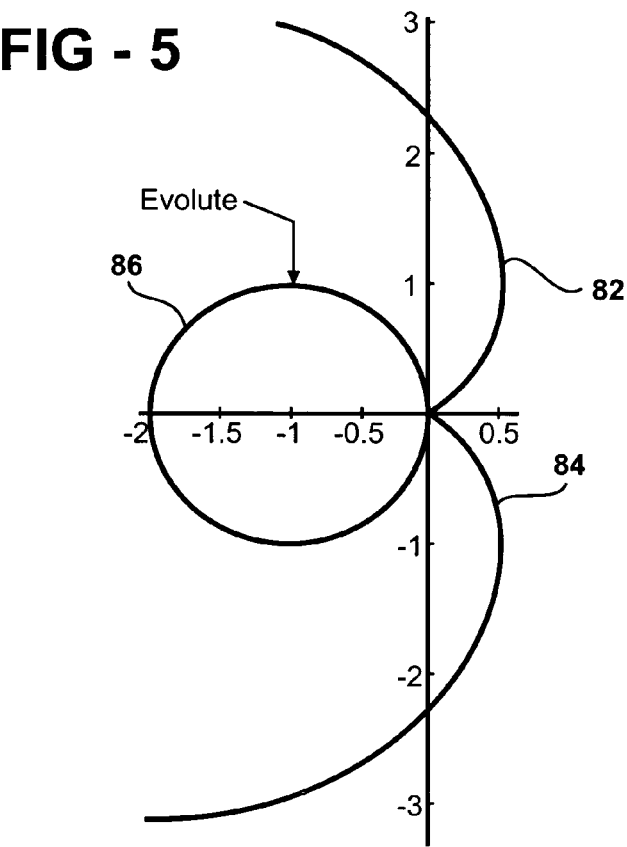
FIG. 5 is a graph depicting an evolute circle and the involute curve of FIG. 4.
Figure 6:
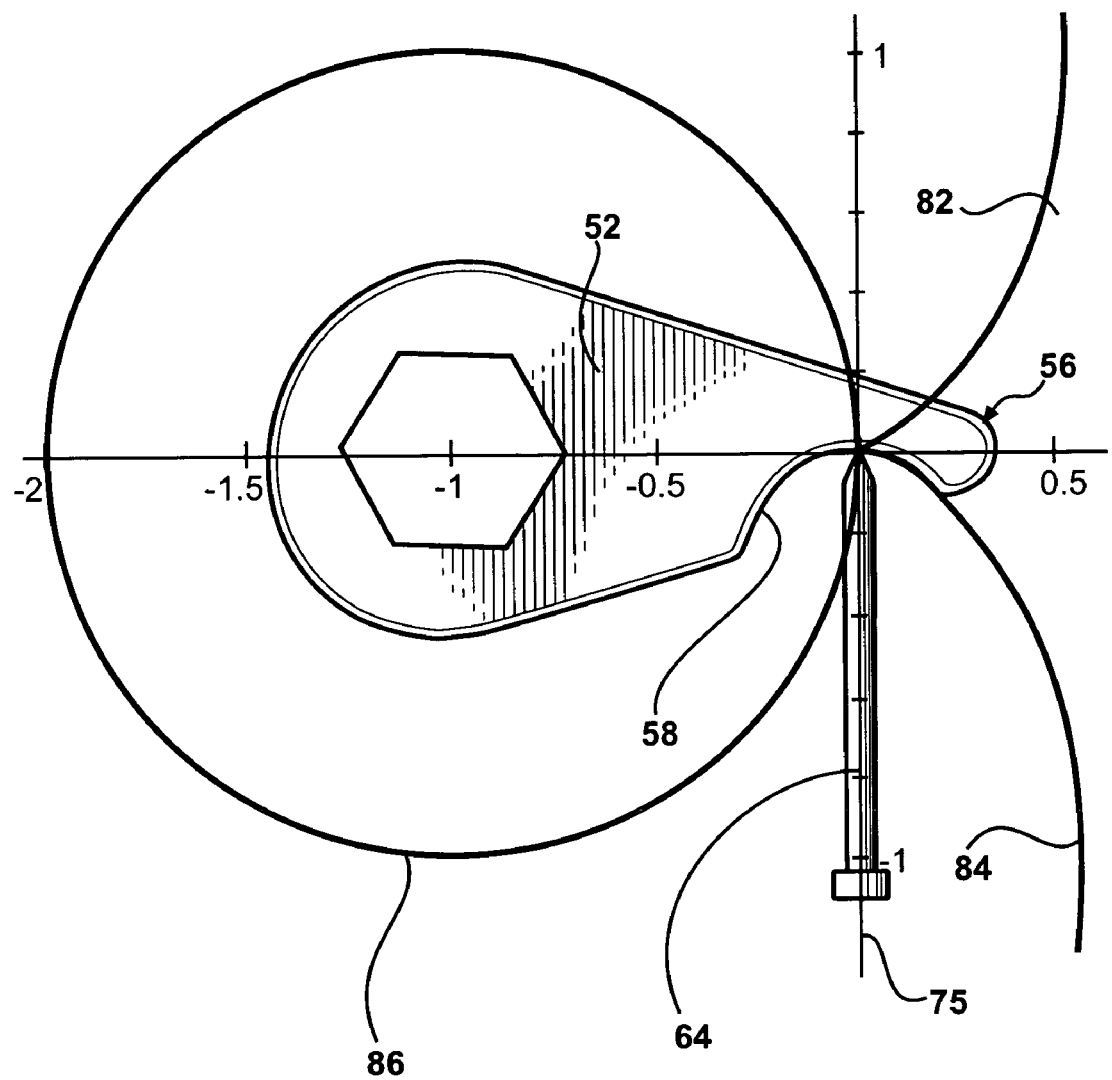
FIG. 6 is a side elevation view of the adjuster arm in accordance with the present invention, similar to FIG. 2, shown with the evolute circle and the involute curve of FIG. 5 overlaid thereon.

It is observed that the equations 20 and 21 of the evolute fits the following equation:

$(xc+R')^2 + (yc)^2 = R'^2$ (equation 22). The equation 22, therefore, is an equation of a circle 86, best seen in FIG. 6 that has the center exactly in the center of the adjuster arm rotation 71 and has the radius R'. The profile found in the equations 12 and 13, therefore is an involute of the evolute circle 86 that has the center at the adjuster arm rotation center 71 and the radius of R. The involute curve 80 has an origin at the neutral contact point 72 that is lying on the evolute circle 86. The direction of the "unwrapping" the string from the evolute gives the profile 82 for positive t or the profile 84 for negative t, shown in FIG. 4. FIGS. 5 and 6 show both profiles 82 and 84 for positive t and for negative t and the evolute circle 86 for R chosen to be unit value (R=1). FIG. 6 shows the evolute circle 86 and the involute curve 80 overlaid the adjuster arm 52.

The theoretical involute curve 80 given by the equations 12 and 13 is difficult to manufacture in a mass production process and, therefore, should be approximated with a circle that is easily obtained by simple machining operation. It is desirable, therefore, to determine an approximation circle for a given adjustment range.

In the technical problem, the adjustment range is limited by the design. If one assumes the limits of the adjustment are of the same sign because opposite signs use different, conflicting branches of the involute curve 80 and defined as follows:

$$a \leq t \leq b \quad \text{(equation 23)}.$$

Note, that a and b of the equation 23 can be either calculated directly from the limits of designed adjuster arm 52 rotation, or by using the equation 15 from the limits of the adjustment bolt 64 travel.

The desired circle has the center located such, that the angle error between circle tangent and involute tangent is minimized across the whole adjustment range. The center of the circle shall be assumed to be at the following coordinates: xd, yd.

Figure 7:
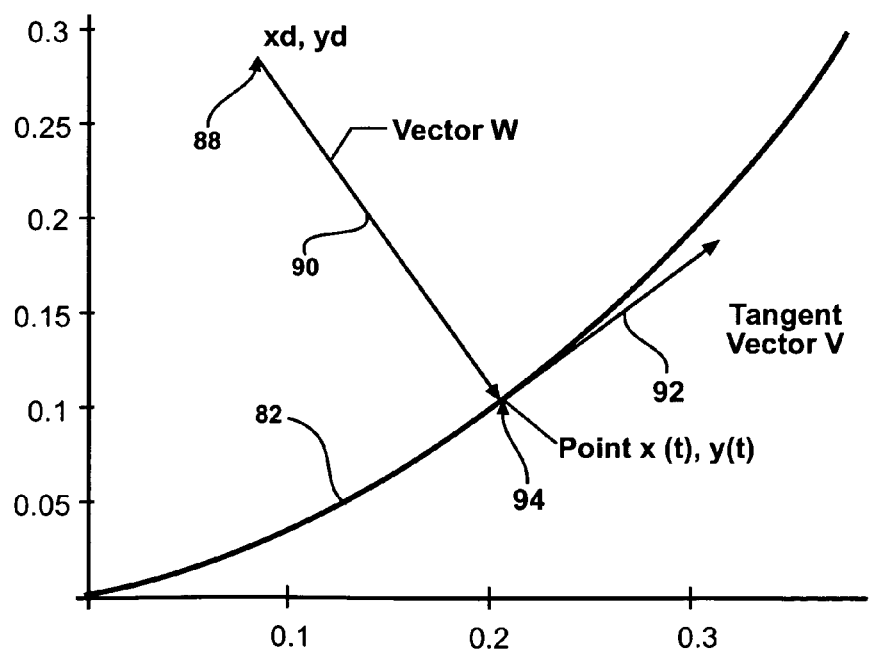
FIG. 7 is a graph depicting an involute curve and vectors.

Referring now to FIG. 7, the involute curve 82, the center 88 of the circle {xd,yd} a first vector W 90, and a second tangent vector V 92 are shown. The first vector W connects center 88 of the circle with some point x(t),y(t) on the involute 82 and the tangent vector V to the involute 82 in this point x(t),y(t).

The vector V is defined by the derivative of the involute curve 82 as follows:

$$V = \left[\frac{dx(t)}{dt}, \frac{dy(t)}{dt}\right] \quad \text{(equation 24)}$$

Substituting the equations 12 and 13 into the equation 24 leads to:

$$V = [R*t*\cos(t), R*t*\sin(t)] \quad \text{(equation 25)}$$

Note that both components of the vector V are multiplied by the same factor "R*t* . . . ". Because only the a tangent vector is sought, the multiplier may be skipped and define for further calculations vector "V" as follows:

V=[cos(t),sin(t)] (equation 26). An additional benefit of the equation 26 is that the vector V has now unit length for any value of t.

The vector W is defined as:

$$W = [(xd - x(t)), (yd - y(t))] \quad \text{(equation 27)}.$$

The desired state is the two vectors W and V are perpendicular to each other at each point of the involute curve 82 along the adjustment range. In practice, this is only possible for a few points, and for every other point of the involute curve 82 there will be some error. Local error will be defined as a square of dot product between the two vectors W and V. For perfectly perpendicular vectors, the dot product is zero, and the bigger the error, the bigger the dot product. A squared value is introduced to keep the error always positive and to artificially enlarge bigger errors.

$$err(t)=W*V=((xd-x(t))*\cos(t)+(yd-y(t))*\sin(t))^2 \quad \text{(equation 28)}$$

The total error over the adjustment range (from a to b, as defined in the equation 23) is defined as:

$$E = \int_a^b err(t)dt \quad \text{(equation 29)}$$

Because err(t) given by the equation 28 is always positive, the E as defined in the equation 29 is accumulative. Smaller values of E describe better approximation of the involute 82 with the circle 86, which allows one to find the best circle center point 88 or xd, yd. The two unknowns can be found by solving the following two equations:

$$\frac{\partial E}{\partial (xd)} = 0, \text{ and} \quad \text{(equation 30)}$$

$$\frac{\partial E}{\partial (yd)} = 0. \quad \text{(equation 31)}$$

By substituting the equations 12, 13, and 28 into the equation 29, integrating and substituting it into the equations 30 and 31 the following equations, after simplification, are obtained:

$$xd(2b-2a+\sin(2b)-\sin(2a))+yd(\cos(2a)-\cos(2b))=2a-2b-4R\sin(a)+4R\sin(b)+R\sin(2a)-R\sin(2b) \quad \text{(equation 32)}$$

$$xd(\cos(2a)-\cos(2b))+yd(2b-2a-\sin(2b)+\sin(2a))=4R\cos(a)-4R\cos(b)-R\cos(2a)+R\cos(2b) \quad \text{(equation 33)}$$

The simple linear equation set consisting of the equations 32 and 33 allows one now to establish optimal center point 88 or xd, yd of the approximation circle 86. After solving and simplifying, the following equations are obtained:

$$xd = \frac{R(b-a+2\sin(a)-\sin(a-b)-2\sin(b))}{a-b+\sin(a-b)} \quad \text{(equation 34)}$$

$$yd = \frac{2R(\cos(b)-\cos(a))}{a-b+\sin(a-b)} \quad \text{(equation 35)}$$

For example, for the unit radius R=1.0 and for the adjustment range a=0.1 and b=0.5, the optimal center 88 of the approximation circle 86 is located at the coordinates: xd=−0.0382992 and yd=0.297489.

The last problem is the approximation circle radius, which is unknown at this point. The approximation circle radius shall be named r. In order to find the optimal radius r, local radius error function is defined as a square of the difference between the distance from the point 94 on the involute 82 to the circle center 88 and radius r.

$$rer(t)=(r-\sqrt{(x(t)-xd)^2+(y(t)-yd)^2})^2 \quad \text{(equation 36)}$$

The local error is squared to always keep the error positive and to artificially boost bigger errors over the small ones. The total error over the adjustment range (a to b, as given in the equation 23) is then defined as:

$$ER = \int_a^b rer(t)dt. \quad \text{(equation 37)}$$

Again as in the xd,yd case, noted above, in equations 29, 30, and 31, the rer(t) function given in the equation 36 is always positive, so the ER number is accumulative. The optimal radius r is achieved, therefore, when the number ER is as small as possible. This is achieved when the following equation is solved for r:

$$\frac{\partial (ER)}{\partial r} = 0 \quad \text{(equation 38)}$$

After substituting the equations 36 and 37 into the equation 38 and performing some algebraic simplification the following equation is achieved:

$$\int_a^b \left(r - \sqrt{(x(t)-xd)^2+(y(t)-yd)^2}\right)dt = 0 \quad \text{(equation 39)}$$

Solving the equation 39 for r leads to the solution:

$$r = \frac{\int_a^b \sqrt{(x(t)-xd)^2+(y(t)-yd)^2}\,dt}{b-a} \quad \text{(equation 40)}$$

The equation 40 is difficult to solve algebraically but can be easily obtained numerically. For the already used example, in equations 34 and 35, where R=1.0, a=0.1, b=0.5 the values of xd=−0.0382992, yd=0.297489, and r=0.30006 are obtained. Of course, the above number values, in practice, are then rounded off to values reasonable for manufacturing and inspection, providing a template for forming the approximated profile of the involute surface 58 on the adjuster arm 52.

Referring again to FIGS. 1 and 2, in operation, the involute surface 58 of the adjuster arm 52 is manufactured according to the equations 12, 13, 22, and 40, noted above. After the adjuster arm 52 is manufactured and during assembly of the apparatus 50, the torsion bar 54 is attached to the adjuster arm 52, forming an adjuster arm and torsion bar assembly, indicated generally at 53. The adjuster arm and torsion bar assembly 53 is installed on the support member 62, the adjustment nut 60 is attached to the support member 62, and the adjustment bolt 64 is threadably attached to the adjustment nut 60. As the adjustment bolt 64 advances in the adjustment nut 60, the shaped free end 66 of the adjuster bolt 64 engages with the involute surface 58 on the adjuster arm 52, causing the adjuster arm 52 to rotate about the center of rotation 71.

When the adjuster arm 52 is rotated, therefore, a torque is placed on the torsion bar 54 because the end of the torsion bar 54 opposite the end attached to the adjuster arm 52 is fixed, thus varying the torsional preload on the torsion bar 54. Preferably, the torsion bar 54 is preloaded by a mechanical device (not shown) such as, but not limited to, a robot torsion bar tightening mechanism, a manually operated socket wrench or the like. The torsion bar crossmember 62 holds adjuster bolt 64, adjustment nut 60, and torsion bar 54, and adjuster arm 52 in the proper relative positions and reacts against the resulting loads caused by the movement of the adjuster bolt 64, the adjuster arm 52, and the torsion bar 54.

The involute surface 58 that is manufactured according to the equations 12, 13, 22, and 40 noted above will advantageously allow the free end 66 of the adjustment bolt 64 to engage, throughout the length of contact with the involute surface 58, at an angle perpendicular to the longitudinal axis 75 of the bolt 64 throughout the travel of the adjuster arm 52 from the contact point 72 to the contact point 74.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An apparatus for preloading a torsion bar comprising:
   an adjustment nut adapted to be rigidly attached to a support member;
   an adjustment bolt threadably engaged in the adjustment nut, having a free end, and having a longitudinal axis; and
   an adjuster arm adapted to be attached to and extend radially from the torsion bar and have a free end including an involute surface formed thereon that is defined by an evolute circle and extends over a predetermined adjustment range of contact, the involute surface being in contact with the free end of the adjustment bolt and perpendicular to the longitudinal axis of the adjustment bolt at any point of contact between the involute surface and free end of the adjustment bolt within the adjustment range of contact.

2. The apparatus of claim 1 wherein the adjuster arm has a center of rotation and the evolute circle is defined by an equation $(xc+R')^2+(yc)^2=R'^2$, where xc is an X-axis distance of a point of contact, within the adjustment range of contact, between the adjustment bolt and the involute surface from a nominal position point of contact, yc is a Y-axis distance of the point of contact, within the adjustment range of contact, between the adjustment bolt and the involute surface from the nominal position point of contact, and R' is a radius of the evolute circle that has a center at the center of rotation of the adjuster arm.

3. The apparatus of claim 1 wherein the adjuster arm has a center of rotation and the involute surface is defined by a first equation $x(t)=R^*(\cos(t)+t^*\sin(t)-1)$ and a second equation $y(t)=R^*(\sin(t)-t^*\cos(t))$, where R is a distance from the center of rotation to a nominal position point of contact between the adjustment bolt and the involute surface, t is an angle of rotation of the adjuster arm from the nominal position point of contact to a point of contact within the adjustment range of contact, x(t) is an X-axis distance of the point of contact between the adjustment bolt and the involute surface from the nominal position point of contact as a function of t, and y(t) is a Y-axis distance of the point of contact between the adjustment bolt and the involute surface from the nominal position point of contact as a function of t.

4. The apparatus of claim 1 wherein the free end of the adjustment bolt includes a tapered surface for contact with the involute surface.

5. An apparatus for preloading a torsion bar comprising:
   an adjustment nut adapted to be rigidly attached to a support member;
   an adjustment bolt threadably engaged in the adjustment nut, having a free end, and having a longitudinal axis; and
   an adjuster arm adapted to be attached to and extend radially f mm the torsion bar, having a center of rotation, and having a free end including a contact surface formed thereon that extends over a predetermined adjustment range of contact, is in contact with the free end of the adjustment bolt, and is defined by the following equation:

$$r = \frac{\int_a^b \sqrt{(x(t)-xd)^2 + (y(t)-yd)^2}\,dt}{b-a},$$

where r is a radius of curvature of the contact surface, t is an angle of rotation of the adjuster arm from a nominal position point of contact between the adjustment bolt and an involute surface to a point of contact within the adjustment range of contact, a and b are the limits of the angle of rotation t with $a \leq t \leq b$, xd is an X-axis coordinate of a center point of the arc defined by the radius r, yd is a Y-axis coordinate of the center point of the arc defined by the radius r, x(t) is an X-axis distance of the point of contact between the adjustment bolt and the involute surface from the nominal position point of contact as a function of t and y(t) is a Y-axis distance of the point of contact between the adjustment bolt and the involute surface from the nominal position point of contact as a function of t.

6. The apparatus of claim 5 wherein the contact surface is further defined by the equations:

$$xd = \frac{R(b-a+2\sin(a)-\sin(a-b)-2\sin(b))}{a-b+\sin(a-b)}$$

and $$yd = \frac{2R(\cos(b)-\cos(a))}{a-b+\sin(a-b)},$$

where R is a distance from the center of rotation to the nominal position point of contact between the adjustment bolt and the involute surface.

7. The apparatus of claim 5 wherein the free end of the adjustment bolt includes a tapered surface for contact with the contact surface.

8. A torsion bar adjustment mechanism for applying and adjusting a preload in an automotive suspension system, the adjustment mechanism comprising:
   a torsion bar having an end;
   a support member;
   an adjustment nut rigidly attached to the support member;
   an adjustment bolt threadably engaged in the adjustment nut, having a free end, and having a longitudinal axis; and
   an adjuster arm attached to the end of and extending radially from the torsion bar, having a center of rotation, and having a free end including a contact surface formed thereon that extends over a predetermined adjustment range of contact, is in contact with the free end of the adjustment bolt, and is defined by the following equation:

$$r = \frac{\int_a^b \sqrt{(x(t) - xd)^2 + (y(t) - yd)^2}\, dt}{b - a},$$

where r is a radius of curvature of the contact surface, t is an angle of rotation of the adjuster arm from a nominal position point of contact between the adjustment bolt and an involute surface to a point of contact within the adjustment range of contact, a and b are the limits of the angle of rotation t with $a \leq t \leq b$, xd is an X-axis coordinate of a center point of the arc defined by the radius r, yd is a Y-axis coordinate of the center point of the arc defined by the radius r, x(t) is an X-axis distance of the point of contact between the adjustment bolt and the contact surface from the nominal position point of contact as a function of t, and y(t) is a Y-axis distance of the point of contact between the adjustment bolt and the contact surface from the nominal position point of contact as a function of t.

9. The apparatus of claim 8 wherein the contact surface is further defined by the equations:

$$xd = \frac{R(b - a + 2\sin(a) - \sin(a - b) - 2\sin(b))}{a - b + \sin(a - b)}$$

and $$yd = \frac{2R(\cos(b) - \cos(a))}{a - b + \sin(a - b)},$$

where R is a distance from the center of rotation to the nominal position point of contact between the adjustment bolt and the involute surface.

* * * * *